(12) United States Patent
Cho et al.

(10) Patent No.: US 10,922,606 B2
(45) Date of Patent: Feb. 16, 2021

(54) MULTI-DIRECTIONAL REDUCTION IN LARGE SCALE DEEP-LEARNING

(71) Applicant: International Business Machines Corporation, Armonk, NY (US)

(72) Inventors: Minsik Cho, Austin, TX (US); Ulrich A. Finkler, Mahopac, NY (US); David S. Kung, Chappaqua, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 15/621,258

(22) Filed: Jun. 13, 2017

(65) Prior Publication Data

US 2018/0357534 A1 Dec. 13, 2018

(51) Int. Cl.
*G06N 5/04* (2006.01)
*G06N 3/063* (2006.01)
*G06N 3/08* (2006.01)

(52) U.S. Cl.
CPC ............ *G06N 3/063* (2013.01); *G06N 3/084* (2013.01); *G06N 5/04* (2013.01)

(58) Field of Classification Search
None
See application file for complete search history.

(56) References Cited

U.S. PATENT DOCUMENTS

| 2003/0204636 | A1 | 10/2003 | Greenblat |
| 2016/0192029 | A1 | 6/2016 | Bergstrom |

FOREIGN PATENT DOCUMENTS

CN 104199972 A 12/2014

OTHER PUBLICATIONS

Mladenov, et al., Lifted Inference for Convex Quadratic Programs, Proceedings of the Thirty-First AAAI Conference on Artificial Intelligence (AAAI-17), 2017, pp. 2350-2356 (Year: 2017).*
Mladenov, et al., Lifted Convex Quadratic Programming, arXiv, Jun. 14, 2016, pp. 1-10 (Year: 2016).*
Anonymously; "Cascade deep learning model training for visual analytics"; IPCOM/000245969D; Apr. 21, 2016; 4 pages.

(Continued)

*Primary Examiner* — Wilbert L Starks
(74) *Attorney, Agent, or Firm* — Stephen R. Yoder; Gilbert Harmon, Jr.

(57) ABSTRACT

A method for executing multi-directional reduction algorithms includes identifying a set of nodes, wherein a node includes at least one data element, creating a set of partitions including one or more data elements from at least two nodes, wherein the at least two nodes are arranged in a single direction with respect to the positioning of the set of nodes, executing a reduction algorithm on the data elements within the created set of partitions, creating an additional set of partitions including one or more data elements from at least two nodes, wherein the at least two nodes are arranged in a different direction with respect to the positioning of the set of nodes, executing a reduction algorithm on the data elements within the created additional set of partitions, and providing a set of reduced results corresponding to the at least one data element.

25 Claims, 11 Drawing Sheets

(56) References Cited

OTHER PUBLICATIONS

Anonymously; "Methods for Deep Learning Network Compression for Resource-constrained Devices"; IPCOM/000246620D; Jun. 21, 2016: 5 pages.
Ramasubramanian, SG. et al.; "SPINDLE: SPINtronic Deep Learning Engine for Large-scale Neuromorphic Computing"; ISLPED '14; Aug. 11-13, 2014, 6 pages.

* cited by examiner

MULTI-DIRECTIONAL REDUCTION IN LARGE SCALE DEEP-LEARNING

BACKGROUND OF THE INVENTION

The present invention relates generally to the field of deep learning, and more specifically to executing multi-directional reduction in deep-learning implementations.

Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

Any or all of the data utilized and created in a deep-learning system may be transmitted across one or more networks, may subsequently be subject to any limitations of said one or more networks. In particular, with respect to large scale deep-learning systems, any network communication may be subject to a bottleneck due to a large number of learners, the frequency of data exchange across the network, and the volume of the data being exchanged. Furthermore, communication across a multi-tiered network can be largely inefficient, as the weakest link or node in the network will largely dictate how the network will perform as a whole.

One approach to increasing efficiency in large scale deep-learning systems is to employ data reduction techniques. Reduce functions are a classical concept from functional programming that effectively reduce an initial set of numbers into a smaller set of numbers via a function. Some existing programming functions enable data reduction across multiple processes, with the result returned either to the root process in some cases or to all of the processes involved in other cases.

When training a deep learning system onto multiple GPUs in parallel, choices must be made regarding how to distribute operations to be executed across the available GPUs. Each GPU then runs forward propagation of the network on its own data, as well as error backpropagation to determine a gradient of loss with respect to any existing network parameters. The GPUs then communicate with one another to compute an average gradient, wherein said communication may occur across various networks. Said communication is susceptible to any network limitations each time communication occurs, which can lead to a severe slowdown of data transfer within a deep learning system.

SUMMARY

As disclosed herein, a method for executing multi-directional reduction algorithm includes identifying a set of one or more nodes, wherein a node of the set of one or more nodes includes at least one data element. The method further includes creating a set of partitions including one or more data elements from at least two nodes of the set of nodes, wherein the at least two nodes of the set of nodes are arranged in a single direction with respect to the positioning of the set of one or more nodes. The method continues by executing a reduction algorithm on the data elements within the created set of partitions, wherein the data elements from within a shared partition are reduced together. The method further includes creating an additional set of partitions including one or more data elements from at least two nodes of the set of nodes, wherein the at least two nodes of the set of nodes are arranged in a different direction with respect to the positioning of the set of one or more nodes. The method continues by executing a reduction algorithm on the data elements within the created additional set of partitions, wherein the data elements from within a shared partition are reduced together. The method further includes providing a set of reduced results corresponding to the at least one data element. A computer program product and a computer system corresponding to the method are also disclosed. Utilizing such a method for multi-directional reduction minimizes the number of transmissions required to communicate between nodes in a system, thereby increasing the efficiency of communications and consequently increasing the efficiency of the entire system.

Also disclosed herein, a method for executing reduction algorithms in a multidimensional array includes identifying a set of one or more nodes arranged in a T-dimensional space, wherein a node of the set of one or more nodes includes at least one data element. The method further includes dividing the set of nodes into T partitions of nodes, wherein a partition includes one or more data elements from at least two nodes of the set of nodes. The method continues by executing a loop-based reduction algorithm in a selected direction on the data elements within the T partitions of nodes, wherein the data elements from within a shared partition are reduced together. The method further includes shifting the T partitions by one direction to provide a next direction for reduction. The method continues by executing an additional loop-based reduction algorithm in the next direction on the data elements within the T partitions of nodes. The method continues by providing a set of reduced results corresponding to the at least one data element.

DETAILED DESCRIPTION

Figure 1:
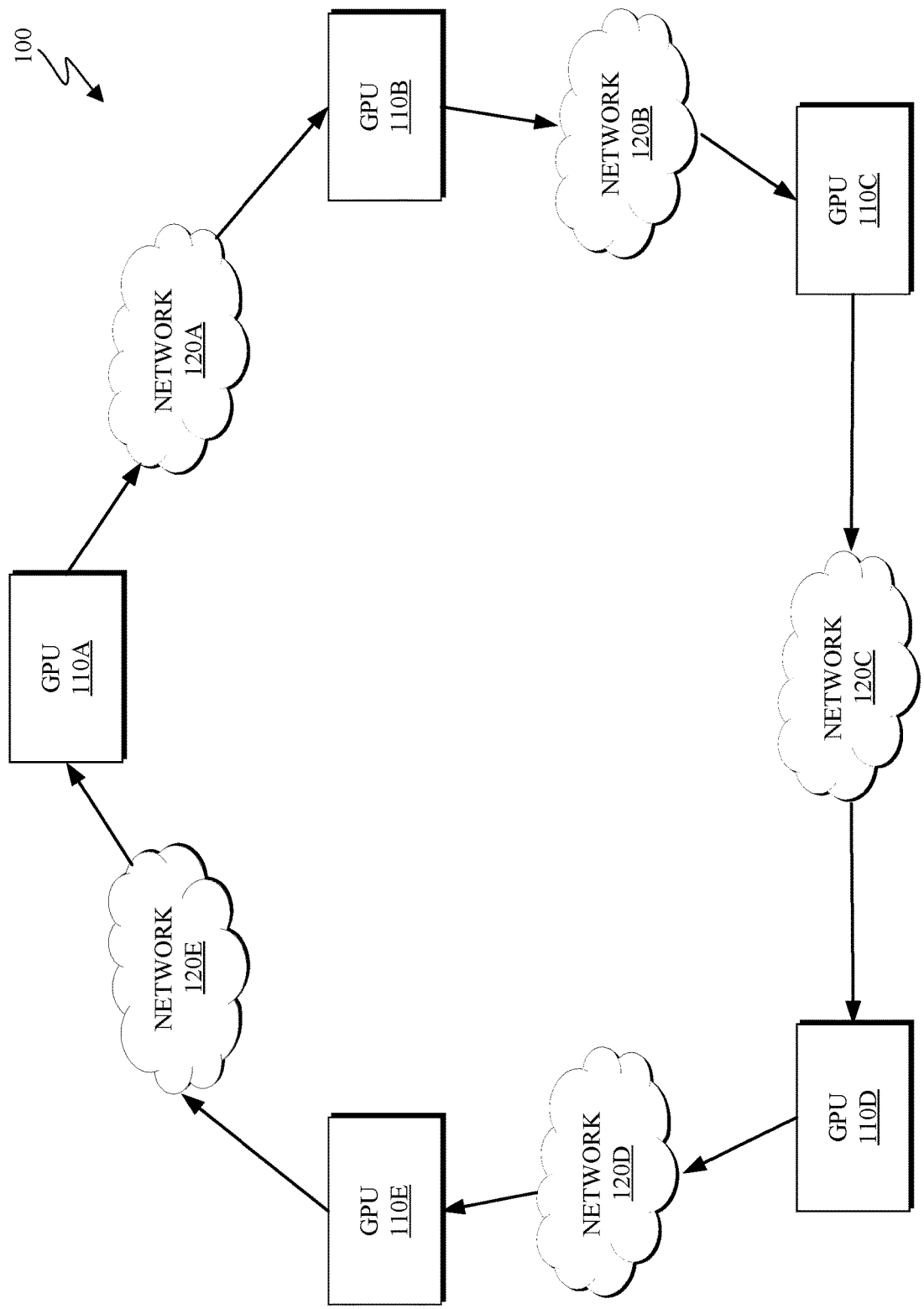
FIG. 1 depicts an example of a deep learning system configured to execute a ring-based allreduce algorithm.

One existing method for increasing efficiency within a deep learning system utilizes a ring-based allreduce function. A ring-based allreduce is an algorithm for which a communication cost within a deep learning system is constant, and is limited only by the slowest connection between GPUs in the system. FIG. 1 depicts an example of a deep learning system configured to execute a ring-based allreduce algorithm. As depicted, deep learning system 100 includes 5 GPUs 110 (110A, 110B, 110C, 110D, and 110E) arranged in a logical ring. Each GPU is connected to its left neighbor and its right neighbor via a network 120. While in the depicted example each pair of GPUs is connected by a separate network (120A, 120B, 120C, 120D, 120E), it should be noted that in other cases some of the GPU pairs may communicate across the same network as other GPU pairs.

In the depicted example, each GPU 110 communicates strictly with its two neighboring GPUs. For example, GPU 110A receives data from GPU 110E and provides data to GPU 110B. In other words, each GPU 110 strictly sends data to its next neighbor and receives data from its previous neighbor. The ring based allreduce algorithm proceeds in two steps, first executing a scatter-reduce algorithm, and then executing an allgather algorithm. Effectively, the scatter-reduce algorithm initializes the GPUs 110 to exchange data such that each GPU 110 ends up with a piece of the final result. In the scatter-reduce step, each GPU 110 combines the data item it receives from another GPU with a data item existing in its own corresponding chunk or partition. This step is performed iteratively until each GPU contains at least one data element that is representative of an aggregation of the corresponding elements from each partition. After the scatter-reduce step is complete, each GPU 110 has an array of values, some of which are the final values which include contributions from each GPU 110. The allgather step transmits these final values from one GPU 110 to the next, and replaces the existing value in a GPU 110 with the final value. After the first iteration, each GPU 110 has two chunks or elements of the final reduced array. The allgather step is executed iteratively until each GPU 110 has each element of the final reduced array.

When executing a ring-based reduction, each transmission step can only be completed as quickly as the most limited network will allow. That is, for each iteration where data elements are exchanged from one GPU to the next, the next iteration cannot begin until a last data element has been transmitted from one GPU 110 to another via the slowest (or most limited) network in the system. The delays introduced by this slowest available network are compounded, as the delay is imposed upon every iteration of the scatter-reduce step and the allreduce step that is executed. The present invention seeks to improve upon this inefficiency by requiring fewer transmissions across the least efficient network.

The present invention will now be described in detail with reference to the FIGS. 2-6. Implementation of embodiments of the invention may take a variety of forms, and exemplary implementation details are discussed subsequently with reference to the Figures.

Figure 2:
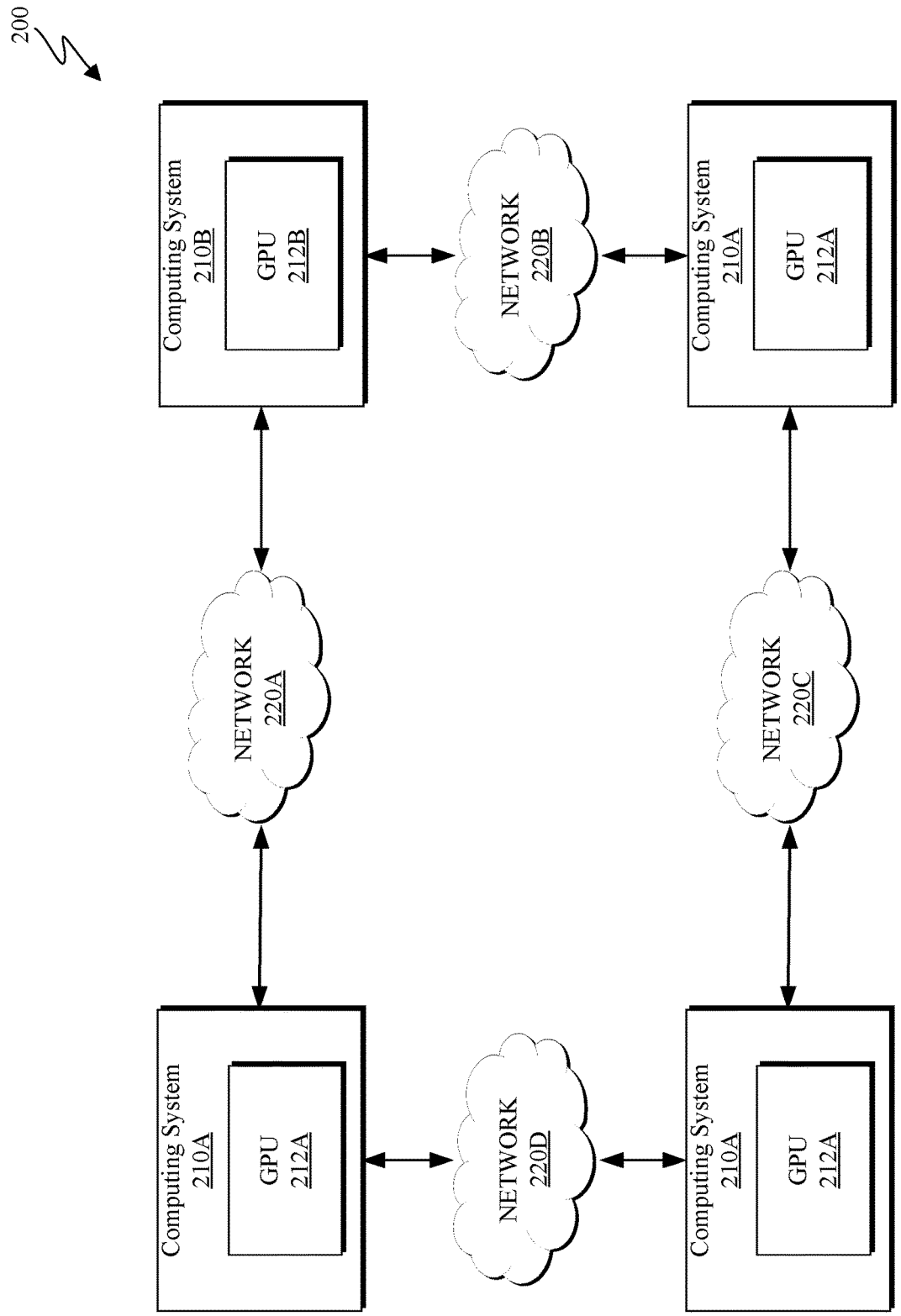
FIG. 2 is a functional block diagram depicting a deep learning system in accordance with some embodiments of the present invention.

FIG. 2 is a functional block diagram depicting a deep learning system 200 in accordance with some embodiments of the present invention. As depicted, deep learning system 200 includes computing systems 110 (i.e., 210A, 210B, 210C, and 210D), a multidimensional reduction program 212, and a plurality of networks 220. Multidimensional reduction system 200 enables improved efficiency in communication within a deep learning environment Computing systems 210 can be desktop computers, laptop computers, specialized computer servers, or any other computer systems known in the art. In some embodiments, computing systems 210 represent computer systems utilizing clustered computers and components to act as a single pool of seamless resources. In general, computing systems 210 are representative of any electronic devices, or combinations of electronic devices, capable of executing machine-readable program instructions, as described in greater detail with regard to FIG. 7.

As depicted, each computing system 210 includes a graphics processing unit (GPU) 212. Each GPU 212 is a circuit designed to manipulate and alter memory to facilitate creation of images for display. In at least one embodiment, GPUs 212 are configured to execute multidimensional reduction algorithms according to a multidimensional reduction method. Multiple embodiments of such a method are described with respect to FIG. 3 and FIG. 4.

Each of networks 220 can be, for example, a local area network (LAN), a wide area network (WAN) such as the Internet, or a combination of the two, and include wired, wireless, or fiber optic connections. In general, networks 220 can be any combination of connections and protocols that will support communications between computing systems 210 in accordance with an embodiment of the present invention. In at least one embodiment of the present invention, networks 220 facilitate data transmissions between computing systems 210 within a deep learning system 200.

Figure 3:
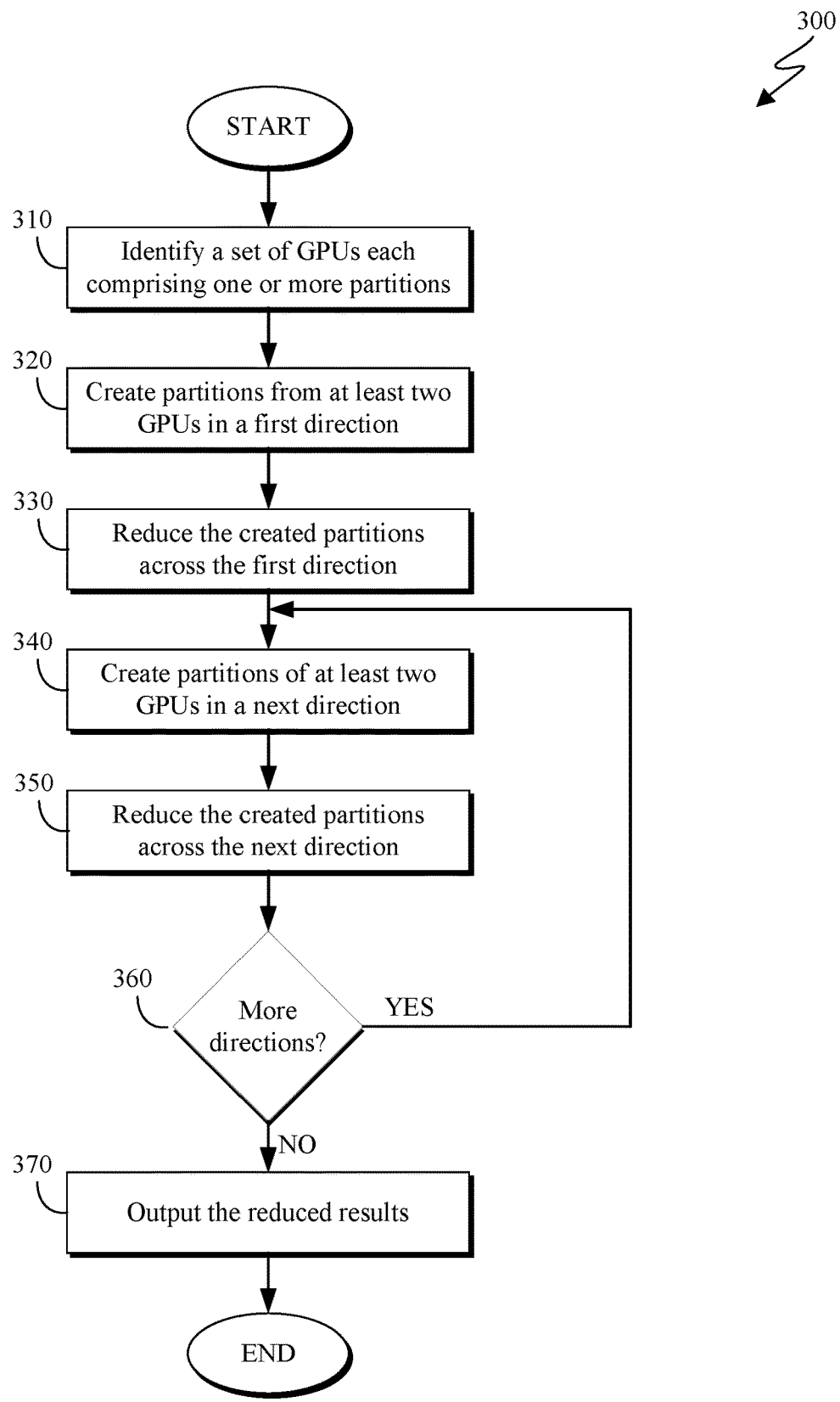
FIG. 3 depicts a multidimensional reduction method in accordance with at least one embodiment of the present invention.

FIG. 3 depicts a multidimensional reduction method 300 in accordance with at least one embodiment of the present invention. As depicted, multidirectional reduction method 300 includes identifying (310) a set of graphics processing units (GPUs) each comprising one or more data elements, creating (320) partitions from at least two GPUs of the set of GPUs in a first direction, reducing (330) the grouped partitions, grouping (340) partitions from at least two GPUs of the set of GPUs in a next direction, reducing (350) the grouped partitions across the next direction, determining (360) whether more directions exist within the set of GPUs, and storing (270) a set of reduced results. Multidimensional reduction method 300 may enable improved efficiency in communications in deep learning systems.

Identifying (310) a set of graphics processing units (GPUs) comprising one or more partitions may include identifying a plurality of graphics processing units utilized by a deep learning system. In at least one embodiment, the graphics processing unit include one or more partitions. The partitions may be indexed in the form $G_{I,J}$, where I indicates which GPU $G_{I,J}$ refers to, and wherein J indicates which partition of GPU I $G_{I,J}$ refers to. In other embodiments, where the GPUs are not partitioned, identifying (310) a set of graphics processing units further includes partitioning the identified GPUs. In such embodiments, the GPUs may be partitioned using any known methods for partitioning data, including (but not limited to) range partitioning, list partitioning, composite partitioning, round-robin partitioning, or hash partitioning, and may be partitioned vertically or horizontally.

Range partitioning includes selecting a partition by determining if a partition key is inside a predetermined range. List partitioning includes assigning each partition a list of values, and determining whether a partition key matches one of said values. Round-robin partitioning ensures uniform data distribution by assigning an $i^{th}$ data item (in insertion order) to partition (i mod n) for n data partitions. Hash partitioning includes applying a hash function to an attribute that yields a partition number. Composite partitioning refers to some combination of multiple other partitioning methods.

Creating (320) partitions from at least two GPUs of the set of GPUs in a first direction may include creating groups or partitions of data elements within two or more GPUs in a first selected direction with respect to the positioning of the GPUs. For example, if a set of 9 GPUs is arranged in a 2-dimensional array with three rows of three GPUs each, creating (320) partitions in a first direction may include grouping the first three data elements in each GPU together horizontally. In other words, the first three data elements in a GPU are grouped with the first three data elements in the other GPUs from the same row of the array to form a partition. The data elements may be partitioned according to one or more selected attributes. For example, a set of data elements that share a source may be partitioned together based on said shared source. In at least some embodiments, the data elements are partitioned such that each partition contains the same number of data elements.

Reducing (330) the created partitions may include executing a reduction function across each partition to provide a reduced result. The utilized reduction function executes an operation or function, such as a summation or multiplication, on the data housed in the created partitions to provide a reduced result. In some embodiments where the utilized operations are not commutative, the operations executed within the reduction function are executed in a selected order. The specified order of operations may be selected by a user or may correspond to the order of input to the GPUs. AllReduce functions may be used to execute a reduction function across each partition and subsequently provide the calculated result to each reduced partition. Providing the calculated reduction result to each reduced partition (and consequently each GPU) enables the reduction results to be accessible across all GPUs as opposed to strictly the root GPU.

Creating (340) partitions from at least two GPUs of the set of GPUs in a next direction may include creating partitions or groups of data elements within two or more GPUs in a next selected direction with respect to the positioning of the GPUs. For example, if a set of 9 GPUs is arranged in a 2-dimensional array with three rows of three GPUs each, creating (340) partitions in a second direction may include grouping the first three data elements in each GPU together vertically to provide a partition. In other words, the first three data elements in a GPU are grouped with the first three data elements in the other GPUs from the same column of the array. The partitions may be created according to one or more selected attributes. For example, a set of data elements that share a source may be grouped together based on said shared source. In at least some embodiments, the partitions are grouped such that each group contains the same number of data elements.

Reducing (350) the grouped partitions across the next direction may include executing a reduction function across each group of partitions to provide a reduced result. The utilized reduction function executes an operation or function, such as, but not limited to, a summation or multiplication, on the data housed in the grouped partitions to provide a reduced result. In some embodiments where the utilized operations are not commutative, the operations executed within the reduction function are executed in a selected order. The specified order of operations may be selected by a user or may correspond to the order of input to the GPUs. AllReduce functions may be used to execute a reduction function across each group of partitions and subsequently provide the calculated result to each reduced partition. Providing the calculated reduction result to each reduced partition (and consequently each GPU) enables the reduction results to be accessible across all GPUs as opposed to strictly the root GPU.

Determining (360) whether more directions exist within the set of GPUs may include determining whether partitions have been created corresponding to each direction in the array of GPUs. If it is determined that more directions exist within the set of GPUs (360, yes branch), the method continues by returning to creating (340) partitions from at least two GPUs in a next direction. If it is determined that more directions do not exist within the set of GPUs (360, no branch), the method continues by providing (370) a set of reduced results.

Outputting (370) a set of reduced results may include storing the reduced results in on each GPU. In at least one embodiment, the reduced results are stored in the respective corresponding partitions within each GPU. In at least one embodiment, providing (460) a set of reduced data elements includes transmitting the set of reduced data elements to a computing system or other device responsive to receiving a query.

Figure 4:
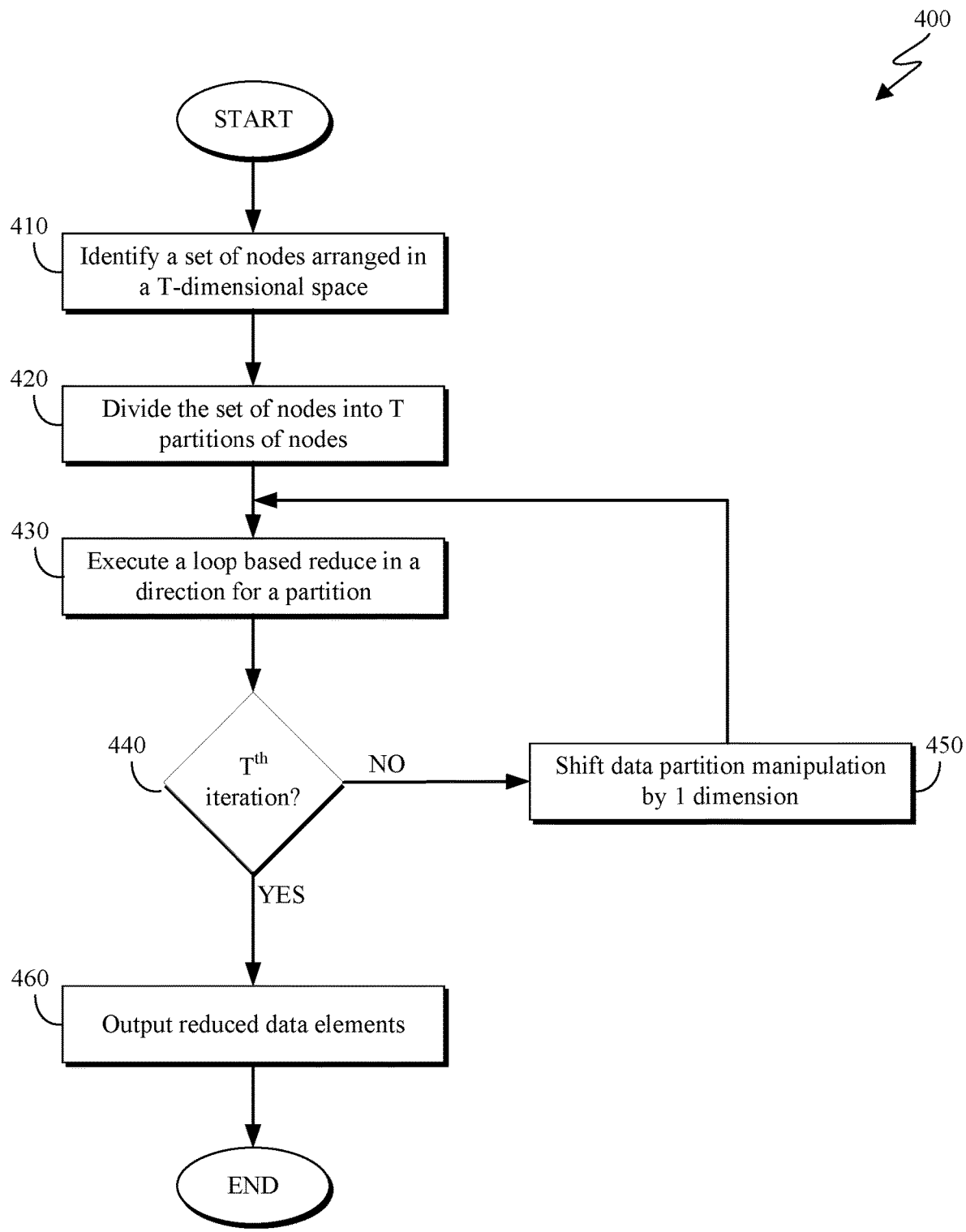
FIG. 4 depicts a multidimensional reduction method in accordance with another embodiment of the present invention.

FIG. 4 depicts a multidimensional reduction method 400 in accordance with another embodiment of the present invention. As depicted, multidimensional reduction method 400 includes identifying (410) a set of nodes arranged in a T-dimensional space, dividing (420) the identified set of nodes into T partitions of nodes, executing (430) a loop based reduce algorithm in one or more directions for a partition, determining (440) if the method has been iterated on the partitions, shifting (450) each partition by 1 direction for reduction, and providing (460) a set of reduced data elements.

Identifying (410) a set of nodes arranged in a T-dimensional space may include identifying a plurality of nodes utilized by a deep learning system. In some embodiments, the nodes correspond to graphics processing units (GPUs). In at least one embodiment, the set of nodes is identified by selecting an initial node, and tracing communications with that node back to other nodes. This process is repeated iteratively from said other nodes until a selected number of iterations pass where no new nodes are identified.

Dividing (420) the identified set of nodes into T partitions of nodes may include using existing partitioning methods to create T partitions within the identified set of nodes. The nodes may be partitioned using any known methods for partitioning data, including (but not limited to) range partitioning, list partitioning, composite partitioning, round-robin partitioning, or hash partitioning, and may be partitioned vertically or horizontally. The partitions may be indexed in the form $G_{I,J}$, where I indicates which GPU $G_{I,J}$ refers to, and wherein J indicates which partition of GPU I $G_{I,J}$ refers to. In some embodiments, the T partitions include an equivalent number of nodes to one another. In other embodiments, the nodes may be partitioned according to selected characteristics, and the partitions may therefore include an unequal number of nodes.

Executing (430) a loop based reduce algorithm for the partitions may include selecting a first partition, wherein the first partition is a T-dimensional subset of the identified set of nodes. In at least one embodiment, executing (430) a loop based reduce algorithm in a direction includes simultaneously reducing the set of partitions each in one of the T directions. As a result of this reduction step, each node would have a sum of the data elements in the same level in a first direction of the selected partition. Executing (430) a loop based reduce algorithm in one or more directions for a partition may occur simultaneously for the partitions.

Determining (440) if the method has been iterated a number of times equal to the dimension of the node arrangement may include using a counter to track how many iterations of the reduction step (430) have been executed. Alternatively, determining (440) if the method has been iterated a number of times equal to the dimension of the node arrangement may include determining if a partition has been reduced in T directions. If the counter reflects that the reduction step has been iterated T times, or it is determined that a partition has been reduced in T directions (440, yes branch), the method continues by providing (460) a set of reduced results. If the counter reflects that the reduction step has not been iterated T times, or it is determined that a partition has not been reduced in T directions (440, no branch), the method continues by shifting (450) each partition by 1 direction for reduction.

Shifting (450) each partition by 1 direction for reduction may include selecting a next direction for each partition to be reduced across. For example, if the nodes are arranged in a three-dimensional space, consider the X, Y, and Z dimensions to be directions 1, 2, and 3, respectively. On a first iteration, each of the partitions may be reduced in a first (X) direction. For the second iteration, shifting (450) each partition by 1 direction for reduction includes shifting each of the partitions to be reduced in a second (Y) direction. Similarly, for the third iteration, shifting (450) each partition by 1 direction for reduction includes shifting each of the partitions to be reduced in a third (Z) direction.

Outputting (460) a set of reduced data elements may include ceasing any reduction operations and finalizing the reduced data results stored in each partition. In at least one embodiment, providing (460) a set of reduced data elements includes transmitting the set of reduced data elements to a computing system or other device responsive to receiving a query.

Figure 5A:
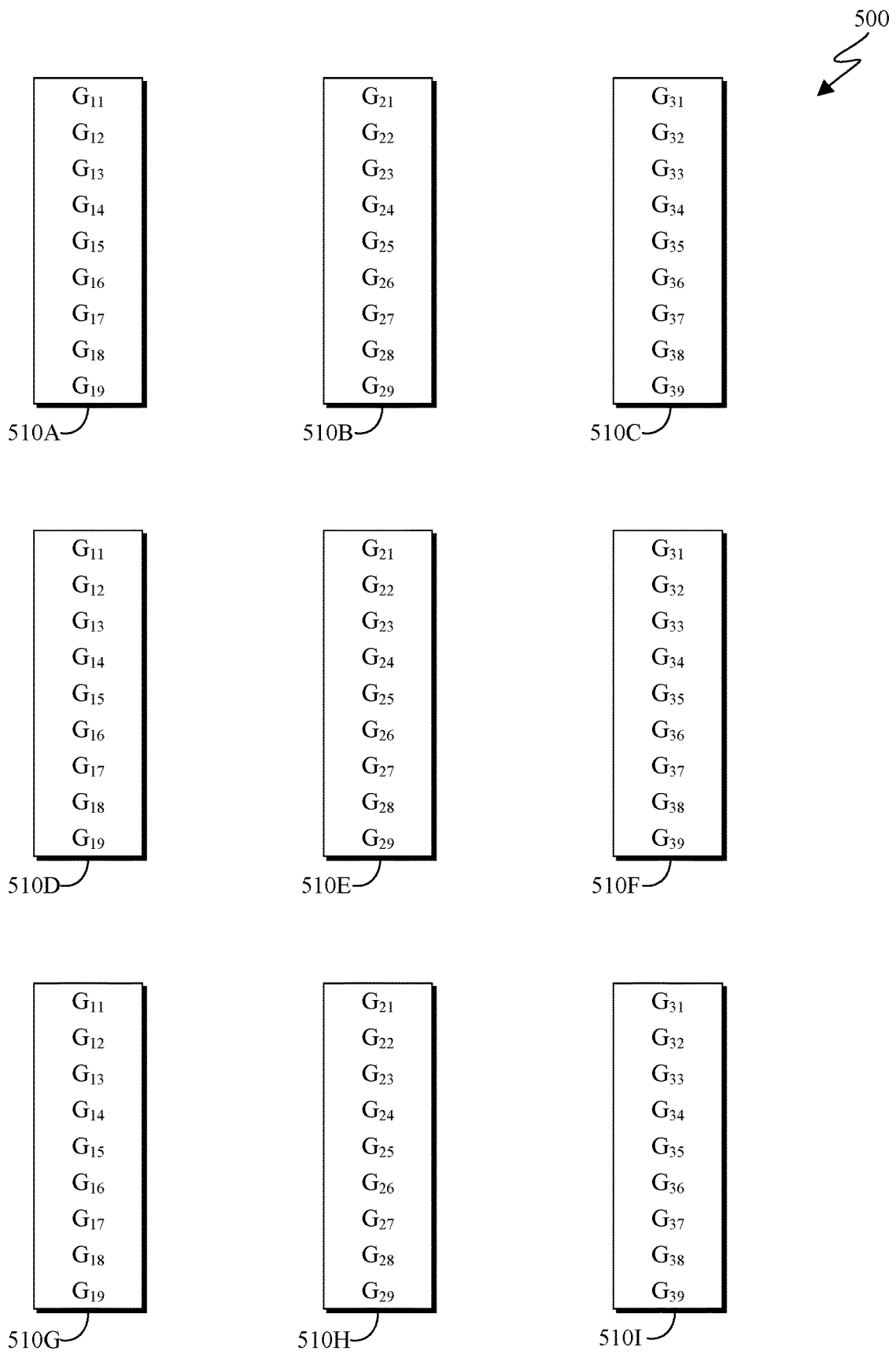
FIG. 5A depicts an example node array in accordance with an exemplary embodiment of the present invention.

FIG. 5A depicts an example node array 500 in accordance with an exemplary embodiment of the present invention. Depicted node array 500 is an example of a two-dimensional node arrangement comprising a set of nodes 510 each comprising a plurality of data entries. Node array 500 can correspond either to a physical node arrangement or a logical node arrangement independent of the physical arrangement of the nodes included in the array. FIG. 5A depicts the node array 500 in an initial state prior to any reduction operations.

Figure 5B:
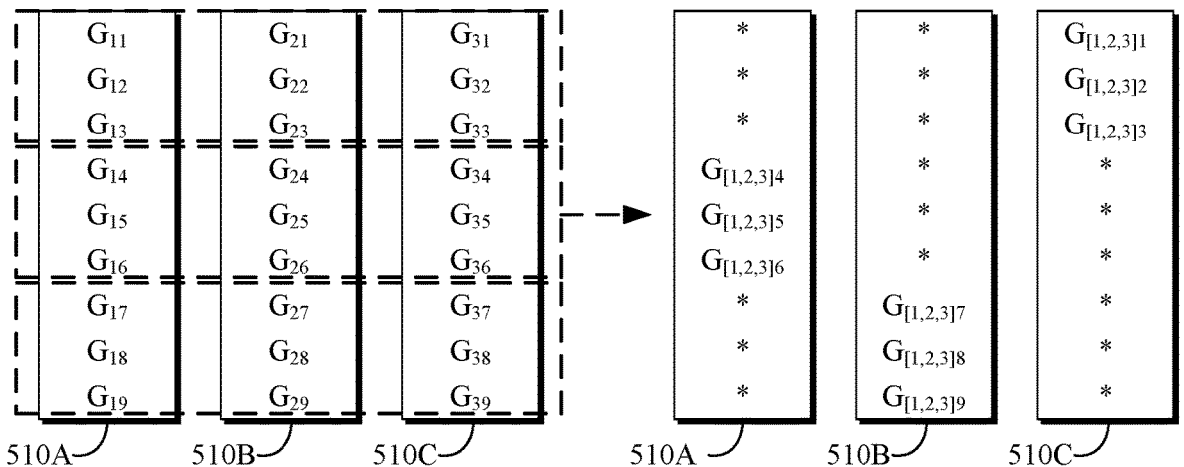
FIG. 5B depicts an example of a first iteration of a multidirectional reduction method as executed on a node array.
Figure 5B:
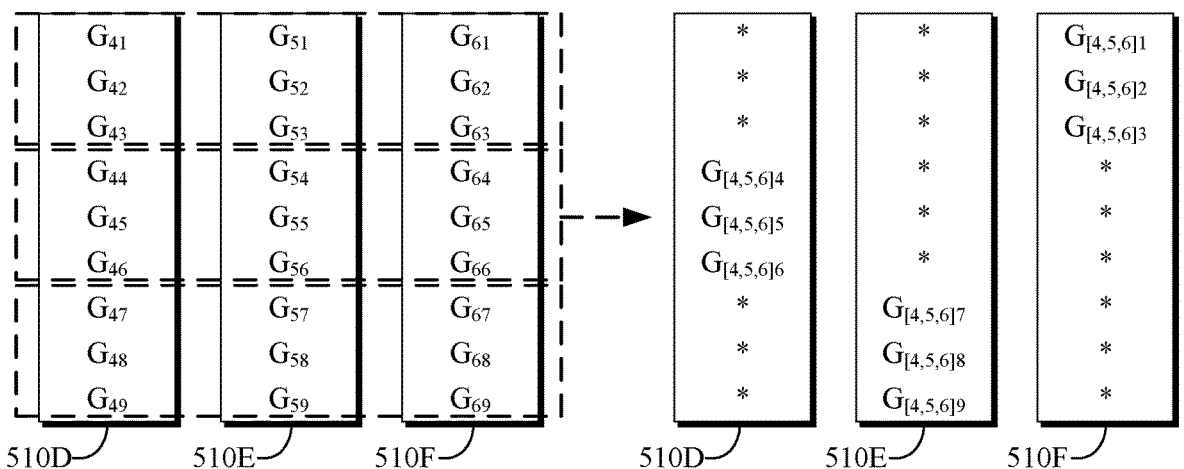
Figure 5B:
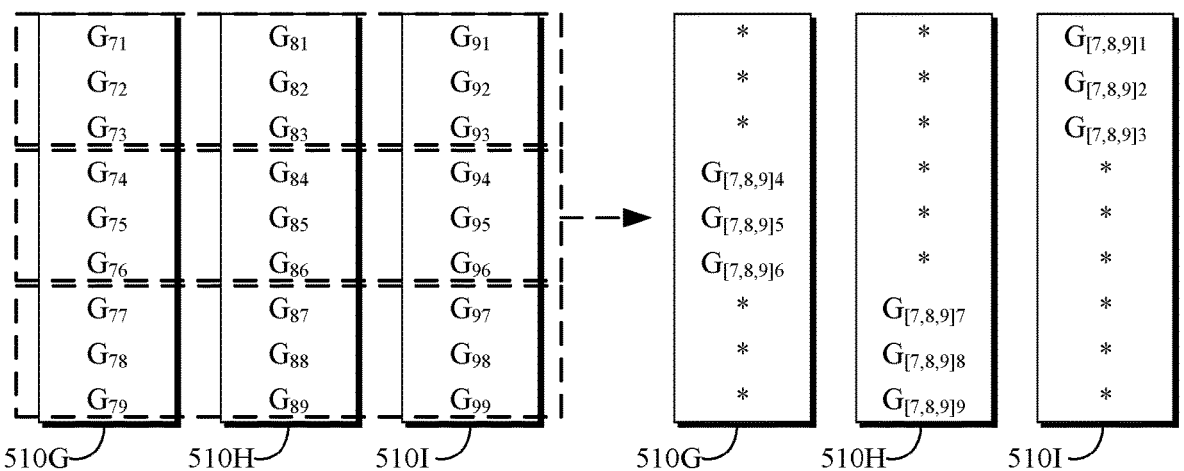

FIG. 5B depicts an example of a first iteration of a multidirectional reduction method as executed on node array 500 depicted in FIG. 5A. As depicted, the left-hand side of FIG. 5B depicts the nodes 510 being partitioned in a first direction. In the depicted example, the partitions are created horizontally across the set of nodes, such that nine partitions each including nine data entries across three separate nodes are created. The arrows in the center of the figure are representative of the execution of a reduction algorithm on the created partitions, and the right-hand side of FIG. 5B depicts the nodes 510 after this reduction. For this example, consider the reduction operation used to be a summation. As depicted, each node includes three reduced elements depicted in the form "$G_{[w,x,y]z}$". With respect to this notation, "$G_{[w,x,y]z}$" corresponds to the reduction of elements $G_{WZ}$, $G_{XZ}$, and $G_{YZ}$. Data entries depicted as asterisks (*) correspond to elements that were reduced in the first iteration of reduction.

Figure 5C:
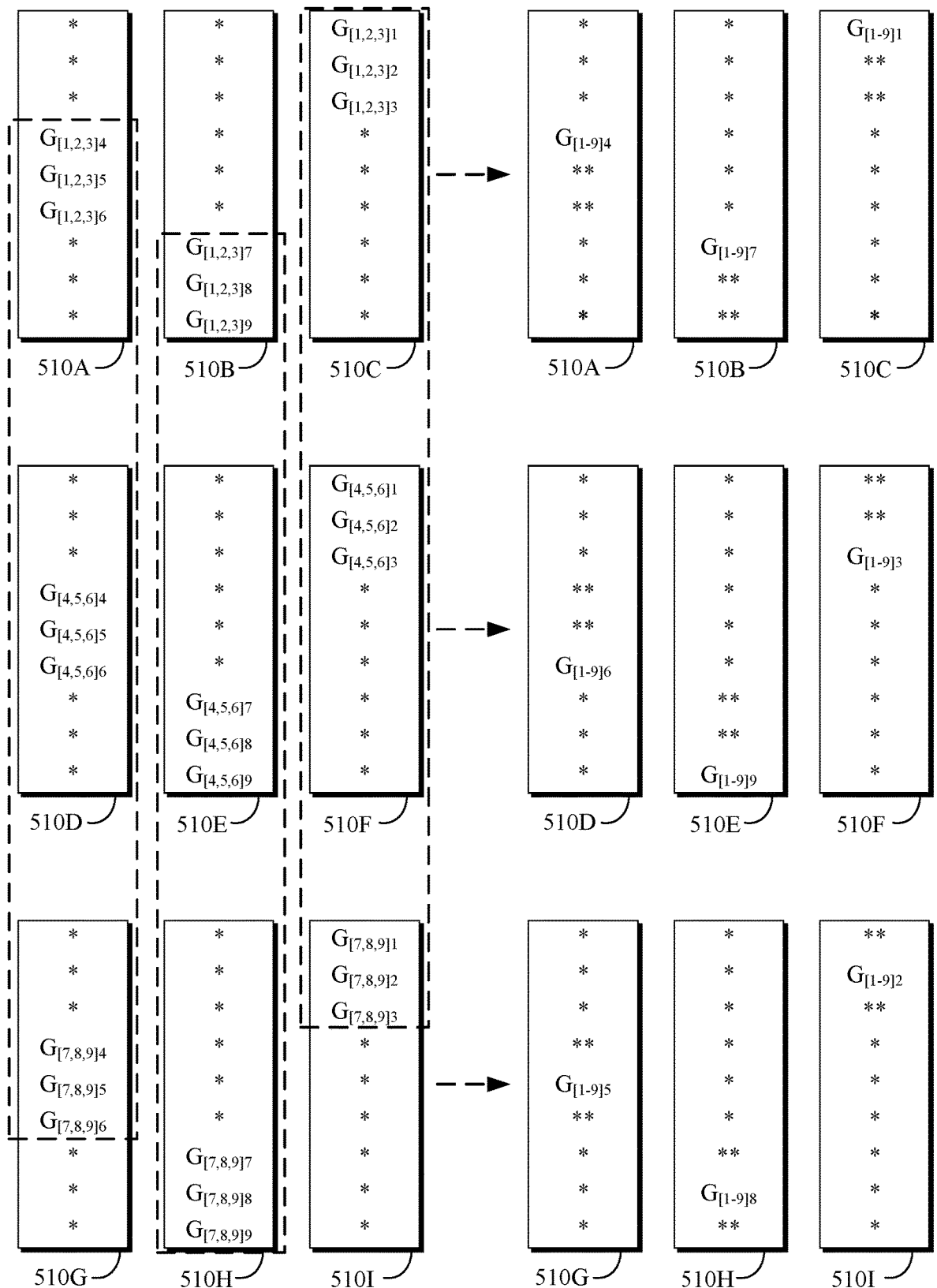
FIG. 5C depicts an example of a second iteration of a multidirectional reduction method as executed on a node array.

FIG. 5C depicts an example of a second iteration of a multidirectional reduction method as executed on node array 500 depicted in FIG. 5A subsequent to the first iteration depicted with respect to FIG. 5B. As depicted, the left-hand side of FIG. 5B depicts the reduced nodes 510 being partitioned in a second direction. In the depicted example, the partitions are created vertically across the set of nodes, such that 3 partitions are created, each partition spanning three separate nodes. The arrows in the center figure are representative of a reduction algorithm on the created partitions, and the right-hand side of FIG. 5C depicts the nodes 510 after said reduction. As depicted, each node 510 includes one reduced element depicted in the form "$G_{[1-9], z}$". With respect to this notation, "$G_{[1-9], z}$" corresponds to the reduction of elements $G_{[1Z]}$, $G_{[2Z]}$, $G_{[3Z]}$, $G_{[4Z]}$, $G_{[5Z]}$, $G_{[6Z]}$, $G_{[7Z]}$, $G_{[8Z]}$, and $G_{[9Z]}$. As before, data entries depicted as single asterisks (*) correspond to elements that were reduced in the first iteration of reduction. Data entries depicted as double asterisks (**) correspond to elements that were reduced in the second iteration of reduction. As depicted, in the final array of nodes 510 after two iterations of reduction each node comprises one fully reduced element corresponding to the entire set of nodes.

Figure 6A:
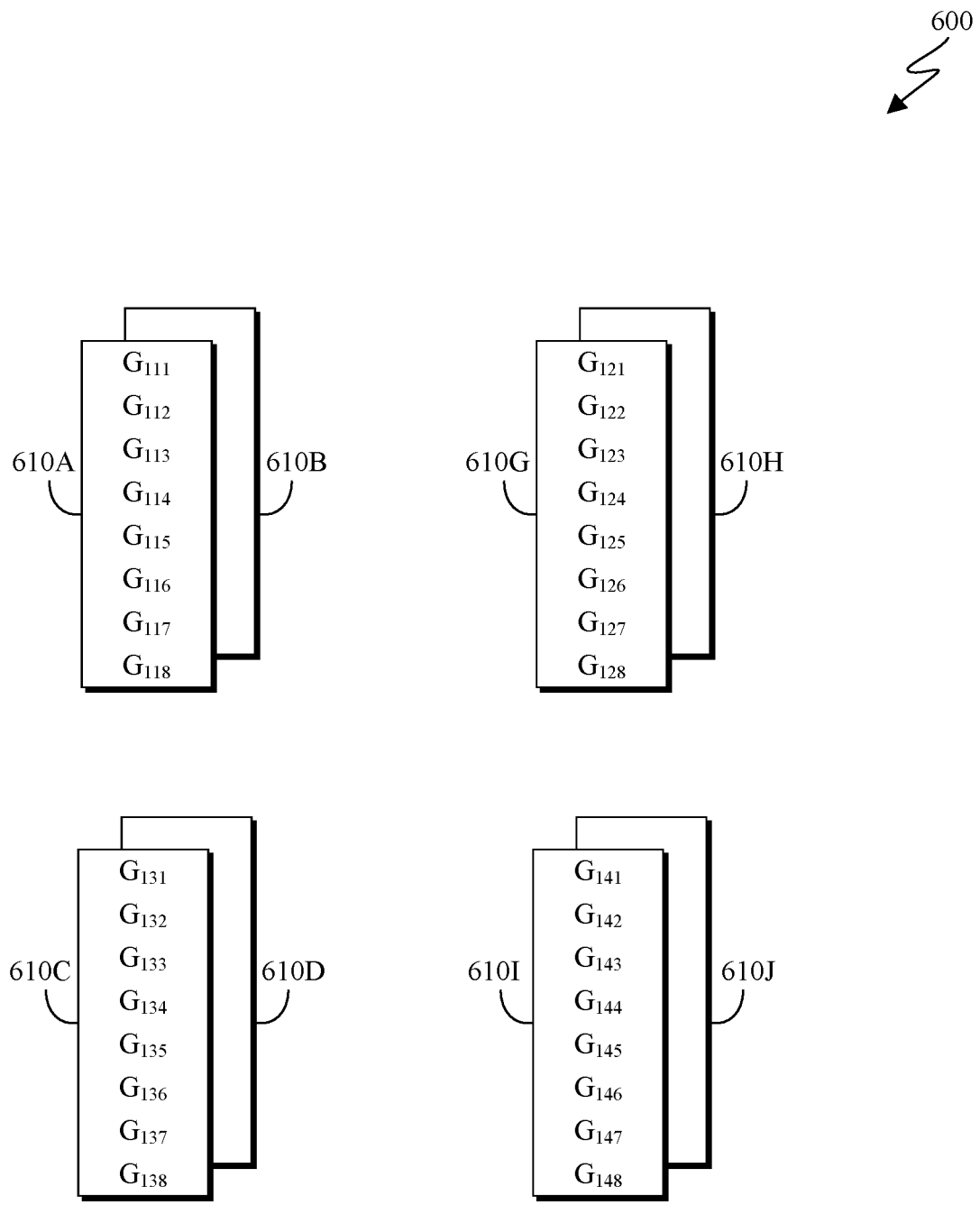
FIG. 6A depicts an example node arrangement in accordance with an exemplary embodiment of the present invention.
Figure 6B:
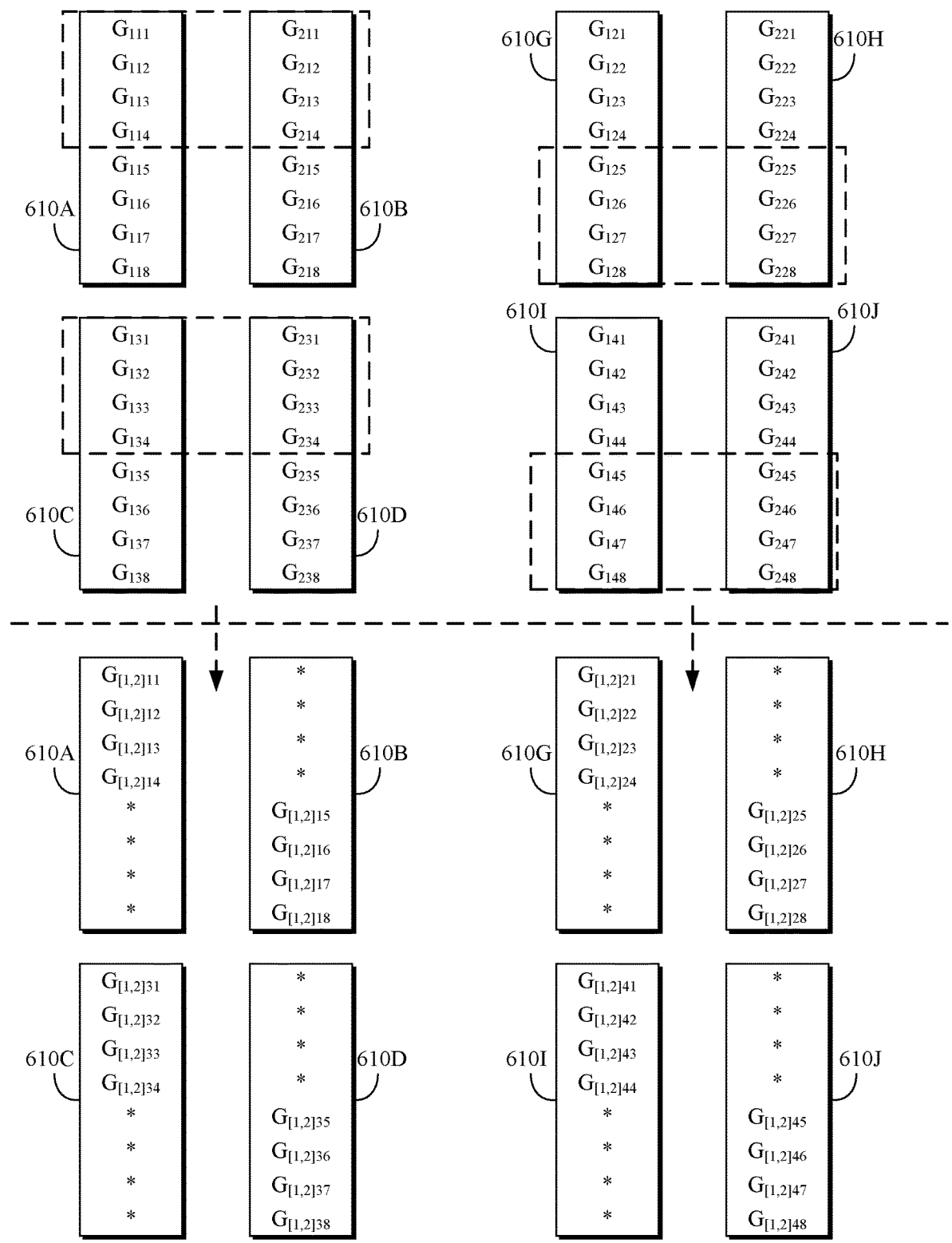
FIG. 6B depicts an example of a first iteration of a multidirectional reduction method as executed on an exemplary node arrangement.

FIG. 6A depicts an example node arrangement 600 in accordance with an exemplary embodiment of the present invention. Depicted node arrangement 600 is an example of a three-dimensional node arrangement comprising a set of nodes 610 each comprising a plurality of data entries. Node arrangement can correspond either to a physical node arrangement or a logical node arrangement independent of the physical arrangement of the nodes included in the array. The top half of FIG. 6B depicts the nodes from FIG. 6A in a different arrangement strictly to enable clearer discussion of each of the individual nodes during the reduction steps. As depicted, the nodes 610B and 610H which are arranged behind nodes 610A and 610G in FIG. 6A have been displayed alongside nodes 610A and 610G in FIGS. 6B and 6C. Similarly, the nodes 610D and 610J which are arranged behind nodes 610C and 610I in FIG. 6A have been displayed alongside nodes 610C and 610I in FIGS. 6B and 6C to facilitate simplified description. FIG. 6A and the top half of FIG. 6B depict the nodes in an initial state prior to any reduction operations.

FIG. 6B depicts an example of a first iteration of a multidirectional reduction method as executed on node arrangement 600 as depicted in FIG. 6A. As depicted, the top half of FIG. 6B depicts the nodes 610 being partitioned in a first direction. In the depicted example, the partitions are created horizontally across the set of nodes, such that eight partitions are created, each including eight data entries. The arrows in the center of the figure are representative of the execution of a reduction algorithm on the created partitions, and the bottom half of FIG. 6B depicts the nodes 610 after this reduction. The elements in this example are referred to using the same notation as in FIGS. 5A-5C with an added index indicating the third dimension. Data entries depicted as asterisks (*) correspond to elements that were reduced in the first iteration of reduction.

Figure 6C:
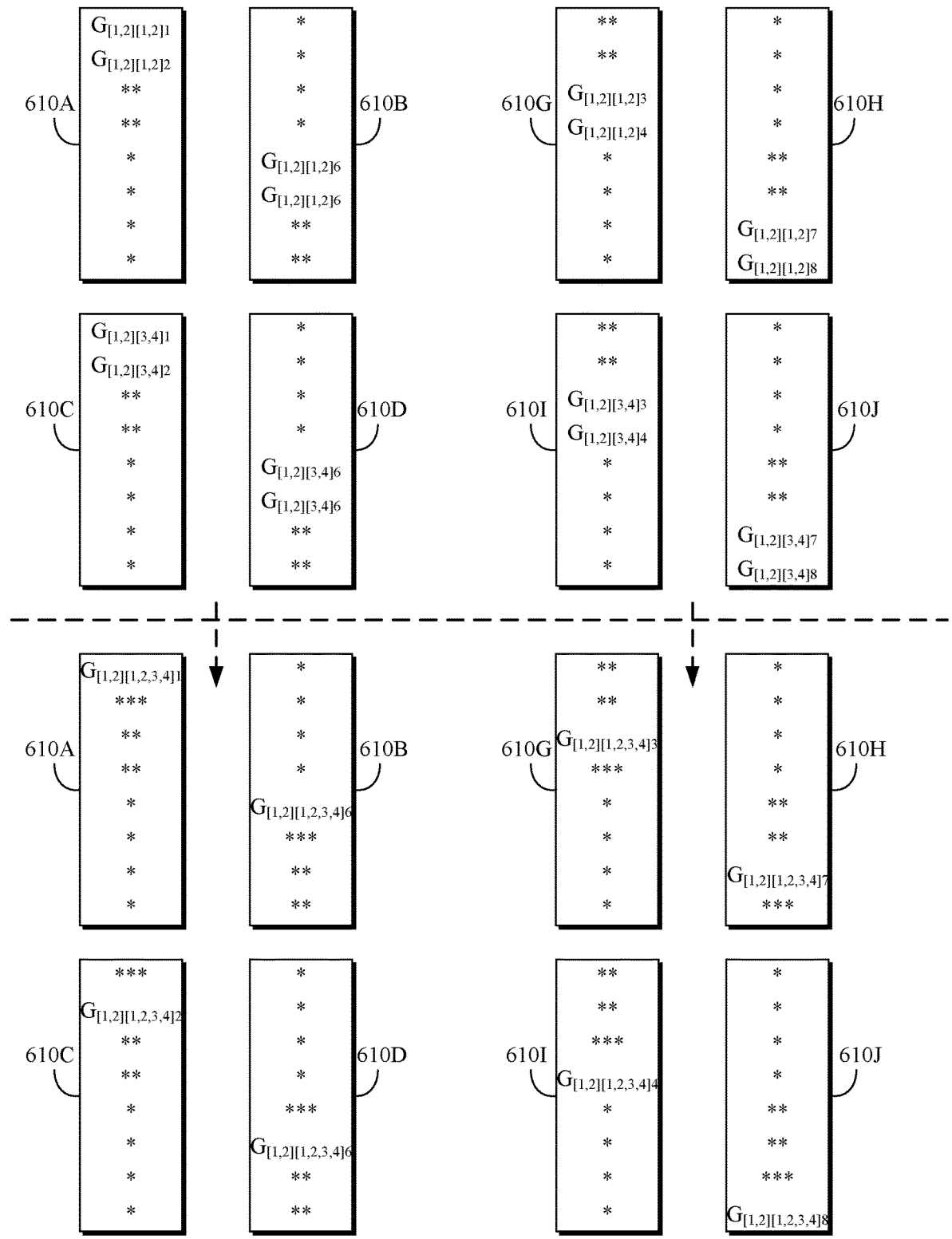
FIG. 6C depicts an example of a second iteration and a third iteration of a multidirectional reduction method as executed on an exemplary node arrangement.

FIG. 6C depicts an example of a second iteration and a third iteration of a multidirectional reduction method as executed on node arrangement 600 as depicted in FIGS. 6A and 6B. As depicted, the top half of FIG. 6C depicts the nodes 610 after a second iteration of a multidirectional reduction method that has partitioned and reduced the nodes 610 in a second, in this case vertical, direction. The arrows in the center of the figure are representative of the execution of a third iteration of a reduction algorithm on the nodes 610 as depicted in the top half of the figure, and the bottom half of FIG. 6B depicts the nodes 610 after this reduction. Data entries depicted as asterisks (*) correspond to elements that were reduced in the first iteration of reduction. Data entries depicted as double asterisks () correspond to elements that were reduced in the second iteration of the reduction, and data entries depicted as triple asterisks (*) correspond to elements that were reduced in the third iteration of the reduction. As depicted, in the final array of nodes 610 after three iterations of reduction each node comprises one fully reduced element corresponding to the entire set of nodes.

Figure 7:
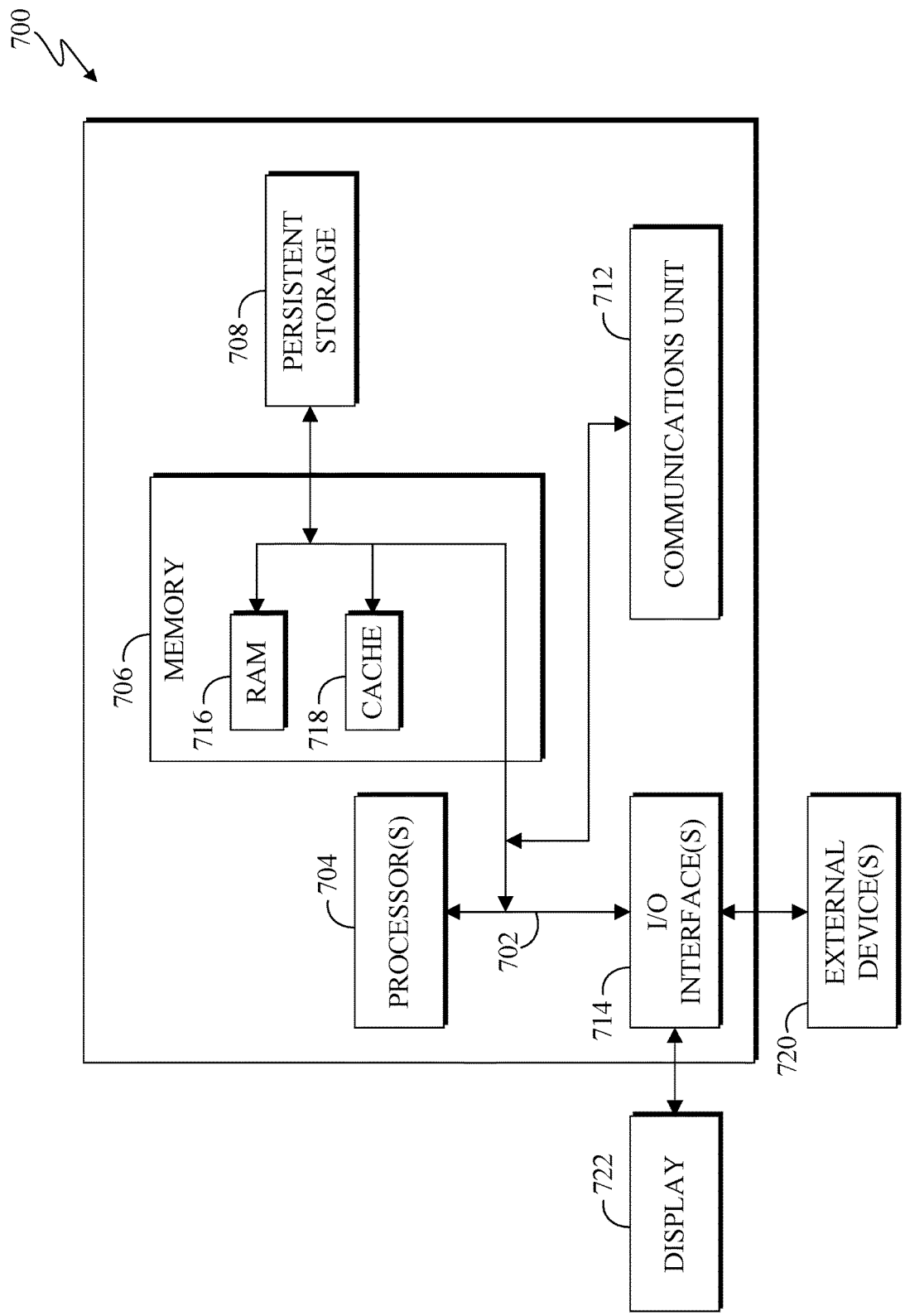
FIG. 7 depicts a block diagram of components of a computer, in accordance with some embodiments of the present invention.

FIG. 7 depicts a block diagram of components of computer 700 in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

As depicted, the computer 700 includes communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

One or more programs may be stored in persistent storage 708 for access and/or execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 714 allows for input and output of data with other devices that may be connected to computer 700. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 708 via I/O interface(s) 714. I/O interface(s) 714 also connect to a display 722.

Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for executing multi-directional reduction algorithms, the method comprising:
   identifying a set of one or more nodes, wherein a node of the set of one or more nodes includes at least one data element;
   creating a set of partitions including one or more data elements from at least two nodes of the set of nodes, wherein the at least two nodes of the set of nodes are arranged in a single direction with respect to the positioning of the set of one or more nodes;
   executing a reduction algorithm on the data elements within the created set of partitions, wherein the data elements from within a shared partition are reduced together;
   creating an additional set of partitions including one or more data elements from at least two nodes of the set of nodes, wherein the at least two nodes of the set of nodes are arranged in a different direction with respect to the positioning of the set of one or more nodes;
   executing a reduction algorithm on the data elements within the created additional set of partitions, wherein the data elements from within a shared partition are reduced together; and
   providing a set of reduced results corresponding to the at least one data element.

2. The method of claim 1, further comprising creating a logical arrangement of the identified set of one or more nodes.

3. The method of claim 2, wherein the set of nodes is arranged in an n-dimensional space, and wherein the created logical arrangement of the identified set of one or more nodes is arranged in an n-dimensional array.

4. The method of claim 1, further comprising distributing a set of reduced results to each node in the identified set of one or more nodes.

5. The method of claim 1, wherein multiple loop-based reduction algorithms are executed simultaneously on multiple partitions.

6. A computer program product comprising:
one or more computer readable storage media and program instructions stored on the one or more computer readable storage media, the program instructions comprising instructions to:
identify a set of one or more nodes, wherein a node of the set of one or more nodes includes at least one data element;
create a set of partitions including one or more data elements from at least two nodes of the set of nodes, wherein the at least two nodes of the set of nodes are arranged in a single direction with respect to the positioning of the nodes;
execute a reduction algorithm on the data elements within the created set of partitions, wherein the data elements from within a shared partition are reduced together;
create an additional set of partitions including one or more data elements from at least two nodes of the set of nodes, wherein the at least two nodes of the set of nodes are arranged in a different direction with respect to the positioning of the nodes;
execute a reduction algorithm on the data elements within the created additional set of partitions, wherein the data elements from within a shared partition are reduced together; and
provide a set of reduced results corresponding to the at least one data element.

7. The computer program product of claim 6, further comprising instructions to create a logical arrangement of the identified set of one or more nodes.

8. The computer program product of claim 7, wherein the set of nodes is arranged in an n-dimensional space, and wherein the created logical arrangement of the identified set of one or more nodes is arranged in an n-dimensional array.

9. The computer program product of claim 6, further comprising instructions to distribute a set of reduced results to each node in the identified set of one or more nodes.

10. The computer program product of claim 6, wherein multiple loop-based reduction algorithms are executed simultaneously on multiple partitions.

11. A computer system for generating natural language processing queries, the computer system comprising:
one or more computer processors;
one or more computer-readable storage media;
program instructions stored on the computer-readable storage media for execution by at least one of the one or more processors, the program instructions comprising instructions to:
identify a set of one or more nodes, wherein a node of the set of one or more nodes includes at least one data element;
create a set of partitions including one or more data elements from at least two nodes of the set of nodes, wherein the at least two nodes of the set of nodes are arranged in a single direction with respect to the positioning of the nodes;
execute a reduction algorithm on the data elements within the created set of partitions, wherein the data elements from within a shared partition are reduced together;
create an additional set of partitions including one or more data elements from at least two nodes of the set of nodes, wherein the at least two nodes of the set of nodes are arranged in a different direction with respect to the positioning of the nodes;
execute a reduction algorithm on the data elements within the created additional set of partitions, wherein the data elements from within a shared partition are reduced together; and
provide a set of reduced results corresponding to the at least one data element.

12. The computer system of claim 11, further comprising instructions to create a logical arrangement of the identified set of one or more nodes.

13. The computer system of claim 12, wherein the set of nodes is arranged in an n-dimensional space, and wherein the created logical arrangement of the identified set of one or more nodes is arranged in an n-dimensional array.

14. The computer system of claim 11, further comprising instructions to distribute a set of reduced results to each node in the identified set of one or more nodes.

15. The computer system of claim 11, wherein multiple loop-based reduction algorithms are executed simultaneously on multiple partitions.

16. A computer implemented method comprising:
identifying a set of one or more nodes arranged in a T-dimensional space, wherein a node of the set of one or more nodes includes at least one data element;
dividing the set of nodes into T partitions of nodes, wherein a partition includes one or more data elements from at least two nodes of the set of nodes;
executing a loop-based reduction algorithm in a selected direction on the data elements within the T partitions of nodes, wherein the data elements from within a shared partition are reduced together;
shifting the T partitions by one direction to provide a next direction for reduction;
executing an additional loop-based reduction algorithm in the next direction on the data elements within the T partitions of nodes; and
providing a set of reduced results corresponding to the at least one data element.

17. The method of claim 16, further comprising creating a logical arrangement of the identified set of one or more nodes.

18. The method of claim 17, wherein the created logical arrangement of the identified set of one or more nodes is arranged in a T-dimensional array.

19. The method of claim 16, further comprising distributing a set of reduced results to each node in the identified set of one or more nodes.

20. The method of claim 16, wherein multiple loop-based reduction algorithms are executed simultaneously on multiple partitions.

21. A computer program product comprising:
one or more computer readable storage media and program instructions stored on the one or more computer readable storage media, the program instructions comprising instructions to:
identify a set of one or more nodes arranged in a T-dimensional space, wherein a node of the set of one or more nodes includes at least one data element;
divide the set of nodes into T partitions of nodes, wherein a partition includes one or more data elements from at least two nodes of the set of nodes;
execute a loop-based reduction algorithm in a selected direction on the data elements within the T partitions of nodes, wherein the data elements from within a shared partition are reduced together;
shift the T partitions by one direction to provide a next direction for reduction;

execute an additional loop-based reduction algorithm in the next direction on the data elements within the T partitions of nodes; and provide a set of reduced results corresponding to the at least one data element.

22. The computer program product of claim 21, further comprising instructions to create a logical arrangement of the identified set of one or more nodes.

23. The computer program product of claim 22, wherein the created logical arrangement of the identified set of one or more nodes is arranged in a T-dimensional array.

24. The computer program product of claim 21, further comprising instructions to distribute a set of reduced results to each node in the identified set of one or more nodes.

25. The computer program product of claim 21, wherein multiple loop-based reduction algorithms are executed simultaneously on multiple partitions.

* * * * *